United States Patent Office 3,268,484
Patented August 23, 1966

3,268,484
POLYMERS OF ALLYLIC ETHERS CONTAINING HYDROXY GROUPS
John R. Costanza, North Plainfield, Elmer E. Waters, Westfield, and John W. Wyart, Maplewood, N.J., assignors to Celanese Corporation of America, New York, N.Y., a corporation of Delaware
No Drawing. Filed June 12, 1962, Ser. No. 201,774
15 Claims. (Cl. 260—77.5)

This invention relates to polymers of monomers having olefinic unsaturation. This invention more particularly refers to the homo or copolymerization of allyl ether derivatives of polyhydric alcohols.

This invention includes homopolymerization of mono- or poly-allyl ether derivatives of polyols wherein the ether derivative still retains at least one unetherified hydroxyl group. This invention also includes the copolymerization of mono- or poly-allyl ether derivatives of polyols with one or more comonomers such as halogenated benzenes, sulfur compounds, halogenated acids, unsaturated acids and esters, and olefins. Additionally, this invention includes cross-linking the homo- or copolymers set forth above with appropriate agents.

According to this invention, allyl etherified polyol compounds having at least two different reactive groups, i.e. hydroxyl and olefinic unsaturation, can be homopolymerized through the olefinic unsaturation ether in bulk, solution or emulsion. Polymerization can be catalyzed by ionic, free radical or redox catalysts as desired. Polyols which are representative of the class are trimethylolethane, known in the art. One such polymerization includes refluxing a solution of monomer, catalyst and initiator in a suitable solvent for about 6 hours under a nitrogen or other inert blanket.

Allyl etherified polyols are polymerizable through the olefinic unsaturation in emulsion. The monomer, catalyst, initiator and emulsifier are mixed with water and heated for a time sufficient to accomplish the polymerization. Suitably the reaction is carried out under reflux conditions under an inert atmosphere blanket.

Catalysts which are particularly well adapted to use in this invention include boron trifluoride dihydrate, boron trifluoride butyl ether, boron trifluoride diacetic acid, boron trifluoride ethylamine, boron trifluoride piperidine, cumene hydroperoxide, t-butyl hydroperoxide, ammonium persulfate, p-menthane hydroperoxide, benzoyl peroxide, methyl ethyl ketone peroxide dissolved in dimethyl phthalate and di-t-butyl peroxide. Polymerization initiators which have been found to be advantageous include acrylamide, triethylamine, sodium metabisulfate, zinc naphthenate, and cobalt naphthenate. One exemplary emulsifier for emulsion polymerization is sodium lauryl sulfate.

Catalyst can be utilized in proportions of about 1 to 20 weight percent, preferably about 2.5 to 12%. The polymerizations are preferably carried out under reflux conditions at atmospheric pressure.

Table I below is a compilation of data on various homopolymerizations carried out under the indicated conditions with the noted catalyst.

Table I

| Catalyst | Temp. | Time | Polymerization Type | TMP-MAE [1] | TMP-DAE [2] |
|---|---|---|---|---|---|
| 2.5% BF₃ butylether | 150 | 6 | Bulk | Clear polymer solution | Slightly turbid polymer solution. |
| 2.5% di-tert-butylperoxide | 150 | 6 | ----do---- | ----do---- | Clear polymer solution. |
| 2.5% tert butyl hydroperoxide/zinc naphthenate (4:1). | 150 | 3 | ----do---- | Turbid solution. Precipitate formed. | Turbid solution. Precipitate formed. |
| 1.0% di-tert-butyl peroxide/triethyl amine (3$1). | 150 | 3 | ----do---- | Pale yellow polymer solution | Pale yellow ploymer solution. |
| 2.8% di-tert-butyl peroxide/ acrylamide | (³) | 6 | Toluene solution | Clear polymer solution | Not tested. |
| 13% Ammonium persulfate/sodium metal bisulfide (2:1). | (³) | 3.5 | Water emulsion | 64% conversion to polymer | 31% conversion to polymer. |

[1] Trimethylol propane monoallyl ether.
[2] Trimethylol propane diallyl ether.
[3] Reflux.

trimethylolpropane, pentaerythritol, glycerine, sucrose, mannitol, inositol, anhydroenneaheptitol, starch, cellulose, cellulose derivatives containing free hydroxyl groups and neopentyl glycol. More specifically, the mono-allyl ether of neopentylglycol, the mono- and di-allyl ethers of trimethylolpropane and trimethylolethane, and the mono-, di- and triallyl ethers of pentaerythritol are particularly well adapted to use in this invention.

Bulk homopolymerization through the unsaturated allyl group of these types of compounds can be accomplished by heating a mixture of the desired monomer and catalyst for a time sufficient to cause polymerization. More specifically, an advantageous technique has been found whereby the conversion of monomer to polymer is substantially increased. In this technique, the desired monomer and a catalyst accelerator or polymerization initiator are mixed together and heated. When the monomer has reached a desired temperature, e.g. about 100 to 150° C., the polymerization catalyst is added and the heating continued until the desired degree of polymerization is attained.

Solution polymerization has been accomplished by dissolving the appropriate monomer and catalyst system in a non-reactive solvent such as for example benzene, dimethyl formamide, methyl ethyl ketone, carbon tetrachloride, xylene, glycerine, butyl Carbitol, toluene, xylol or isophorone and polymerizing according to techniques well

EXAMPLE I

One specific polymerization which was carried out is exemplary of this invention but is not limiting thereon. Trimethylol propane monoallyl ether was homopolymerized in bulk by charging 142.5 parts by weight thereof and 1.5 parts by weight of acrylamide to a reaction vessel. The mixture was heated to 150° C. whereupon 6 parts by weight of di-tert-butyl peroxide was added. The temperature was maintained at 150° C. for 2 hours while the reaction mass was constantly stirred. A 74% conversion of monomer to polymer was accomplished resulting in a pale yellow polymer solution in monomer.

Another aspect of this invention includes the copolymerization of allylethers of polyols, which compounds retain at least one pendant hydroxyl group, with a large variety of comonomers. Various polymerizable monomers adapted to copolymerization according to this invention include vinyl acetate, methyl acrylate, styrene, methyl methacrylate, acrylonitrile, maleic anhydride, dibutyl maleate, dibutyl fumarate, itaconic anhydride, methyl maleurate, sulfur dioxide, sulfur monochloride, and isobutylene. Also, it is within the scope of this invention to copolymerize an allyl ether of a polyol as set forth above with more than one comonomer to form a ter, quad or higher constituent polymer.

Copolymerization according to this aspect of this invention can be carried out in solution, emulsion or bulk similar to homopolymerization set forth above. Ionic, redox and free radical catalysts can be conveniently used as desired in a manner as set forth above with respect to homopolymerization. The comonomer change preferably contains about 10 to 20 mole percent polyol allyl ether. Polymerization initiators or catalyst accelerators as defined above with respect to homopolymerization are also useful in copolymerizing allyl ethers of polyols with other polymerizable monomers. In solution polymerization, the various solvents and those equivalents thereto set forth above with reference to homopolymerization are equally applicable in copolymerization. It is preferred to polymerize by whatever technique under reflux conditions, however other elevated temperatures less than reflux conditions are also operable.

Table II below is a compilation of data taken from several runs in which trimethylol propane monoallylether was solution copolymerized with various monomers. The polymerization was accomplished by refluxing a solution of the comonomers in an appropriate solvent with about 1 to 5% catalyst for about 6 hours.

Similarly sulfur dioxide was copolymerized with trimethylolpropane monoallyl ether in p-dioxane solvent with a silver nitrate catalyst.

Still another aspect of this invention is the cross linking of homo- and copolymers such as set forth above with agents reactive with the hydroxyl group or groups pendant from the polymer chain. Suitable cross linking agents are all those compounds which react with hydroxyl groups such as isocyanates, isothiocyanates, acids, acid anhydrides and acid halides. Thus, thermosetting polymers can be made from substantially linear polymers containing mer units of mono-allyl ether derivatives of polyols. Where the homo- or copolymer contains mer units of polyallyl ethers of polyols, some cross-linking takes place during the initial polymerization due to the presence of a multiplicity of olefinic polymerization-reactive sites. In these situations, the polymer may be further hardened or set up by additional cross-linking through the pendant hydroxyl groups.

Where polyisocyanates or isothiocyanates are utilized as cross-linking agents, urethane linkages are formed. As with other types of urethanes, a blowing agent may be incorporated, or internal gassification techniques utilized to create a foam product. Iso- or isothiocyanate cross-linking can be accomplished under conditions and by processes well known to the polymer art. The final product has some of the properties of the initial polymer chain with properties of the cross-linking urethane linkages superimposed thereon. Thus where a terpolymer of vinyl acetate, butyl acrylate and trimethylol propane monoallyl ether is cross-linked with tolylene diisocyanate, the resulting cross-linked "quad" polymer has some of the properties of acrylic polymers and some of the properties of urethane polymers.

Similarly, cross-linking can be accomplished, as stated above, with dibasic acids, diacid halides or dinitriles to develop an ultimate polymer having many of the attributes of both the olefinic polymer and the ester polymers and yet having other properties unique unto itself due to its three dimentional polymeric system.

Many of the polymers of this invention are suited to use as film forming or molding materials. Some are fiber forming polymers. Other polymers possess solvent resistant qualities that make them excellent for chemical equipment coating applications. The urethane cross-linked polymers make excellent foams. Many of the low molecular weight polymers of this invention are good waxes. Those polymers containing high halogen constituent proportions are good fire and flame retardants.

It should be understood that this specification has been given by way of illustration only and nothing contained herein is in any way limiting upon this invention.

Having described our invention what we desire to secure by Letters Patent is:

1. The process of polymerizing a monomer mass comprising an allyl ether of a polyol containing a pendant hydroxyl group, which process comprises heating said ether together with a polymerization initiator to an elevated temperature of about 100 to 150° C.; admixing an olefinic polymerization catalyst therewith; and heating said mixture to an elevated temperature higher than about 100° C. for a time sufficient to polymerize said monomer mass.

2. A solid homopolymer prepared by the process of claim 1 of trimethylol propane monoallylether.

3. A solid homopolymer prepared by the process of claim 1 of trimethylol propane diallylether.

4. A solid copolymer prepared by the polymerization process of claim 1 of an admixture of trimethylol propane monoallyl ether and an unsaturated acid anhydride selected from the group consisting of maleic anhydride, fumaric anhydride and itaconic anhydride; said copolymer containing from about 10 to 20 mole percent of trimethylol propane monoallyl ether.

5. A solid copolymer prepared by the polymerization process of claim 1 of an admixture of trimethylol propane monoallyl ether and an unsaturated ester selected from the group consisting of vinyl acetate, methyl acrylate, methyl methacrylate, dibutyl maleate, dibutyl fumarate and methyl maleurate; said copolymer containing from about 10 to 20 mole percent of trimethylol propane monoallyl ether.

6. A solid copolymer prepared by the polymerization process of claim 1 of an admixture of trimethylol propane monoallyl ether and styrene; said copolymer containing about 33 mole percent of trimethylol propane monoallyl ether.

7. The process claimed in claim 1 including heating said mixture in an inert solvent under reflux conditions.

8. The process claimed in claim 1 wherein said catalyst is selected from the group consisting of boron trifluoride dihydrate, boron trifluoride butyl ether, boron trifluoride diacetic acid, boron trifluoride ethyl amine, boron trifluoride piperidine, cumene hydroperoxide, tert-butyl hydroperoxide, ammonium persulfate, p-menthane hydroperoxide, benzoyl peroxide, methyl ethyl ketone peroxide dissolved in dimethylphthalate, and di-tert-butyl peroxide.

Table II

| Comonomer | Mole Ratio | Solvent | Catalyst | Initiator | Conversion, Percent |
|---|---|---|---|---|---|
| Styrene | (3:1) | Xylol | di-t-butyl peroxide | Acrylamide | 59.2 |
| Vinyl acetate | (3:1) | do | Dibenzoyl peroxide | do | 22 |
| Methyl acrylate | (13:1) | do | di-t-butyl peroxide | do | 83 |
| Methyl methacrylate | (9:1) | Dimethyl formamide | do | Azodiisobutyronitrile | 88 |
| Maleic anhydride | (1:1) | Ethyl acetate | Dibenzoyl peroxide | Acrylamide | 90 |
| Dibutyl maleate | (1:1) | do | do | do | 7.2 |
| Dibutyl fumarate | (1:1) | do | do | do | 64 |
| Itaconic anhydride | (1:1) | do | do | do | 90 |
| Methyl maleurate | (1:1) | do | do | Self | 69 |
| Maleic anhydride butyl acrylate | (1:1) | do | do | None | 88 |

9. The process claimed in claim 1 carried out in bulk.

10. The process claimed in claim 7 wherein the solvent is selected from the group consisting of benzene, methylethyl ketone, dimethyl formamide, carbon tetrachloride, xylol, xylene, glycerine, butyl carbitol, toluene and isophorone.

11. The process claimed in claim 7 carried out in an emulsion.

12. A solid homopolymer prepared by the process of claim 1 of an allyl ether of a polyol having at least one pendant hydroxyl group; said polyol being selected from the group consisting of trimethylol ethane, trimethylol propane, pentaerythritol, and neopentyl glycol.

13. A solid copolymer prepared by the polymerization process of claim 1 of an admixture of a monoallyl ether of a polyol selected from the group consisting of trimethylolethane, trimethylolpropane, pentaerythritol and a compound selected from the group consisting of olefinic compounds, unsaturated acids, unsaturated esters, unsaturated acid anhydrides, sulfur dioxide and sulfur monochloride; said copolymer containing from about 10 to 20 mole percent of said monoallyl ether of said polyol.

14. The solid homopolymer of claim 12 cross-linked with an organic polyfunctional compound selected from the group consisting of polyisocyanates, polyisothiocyanates, polycarboxylic acids, polycarboxylic acid anhydrides and polycarboxylic acid chlorides.

15. The solid homopolymer of claim 12 cross-linked with tolylene diisocyanate.

References Cited by the Examiner

UNITED STATES PATENTS

| | | | |
|---|---|---|---|
| 2,545,689 | 3/1951 | Dannenberg | 260—91.1 |
| 2,798,053 | 7/1957 | Brown | 260—78.5 |
| 2,854,486 | 9/1958 | McShane | 260—614 |
| 2,871,226 | 1/1959 | McShane | 260—77.5 |

JOSEPH L. SCHOFER, *Primary Examiner.*

LEON J. BERCOVITZ, *Examiner.*

L. WOLF, *Assistant Examiner.*